United States Patent [19]

Smith et al.

[11] Patent Number: 4,573,306

[45] Date of Patent: Mar. 4, 1986

[54] BELTLESS SWINGARM MOWER

[75] Inventors: Alexander Smith; Burton D. Baggs, both of Sanford, Fla.

[73] Assignee: E. E. White, Miami, Fla.

[21] Appl. No.: 165,220

[22] Filed: Jul. 1, 1980

[51] Int. Cl.$^4$ .................... A01D 75/18; A01D 55/18
[52] U.S. Cl. ........................................ 56/10.4; 56/13.6
[58] Field of Search ................. 56/10.4, 13.6, 15.5, 56/17.1, 295

[56] References Cited

U.S. PATENT DOCUMENTS

| | | | |
|---|---|---|---|
| 2,304,421 | 12/1942 | Rogers | 56/10.4 |
| 2,305,959 | 12/1942 | Frederiksen | 56/10.4 |
| 2,575,369 | 11/1951 | Thornton-Trump | 56/10.4 |
| 2,579,862 | 12/1951 | Richardson | 56/237 |
| 2,603,050 | 7/1952 | Scheer | 56/13.6 |
| 2,721,438 | 10/1955 | O'Maley | 56/295 |
| 2,856,747 | 10/1958 | Kolls | 56/295 |
| 3,010,269 | 11/1961 | Maguirie | 56/295 |
| 3,068,630 | 12/1962 | Caldwell | 56/13.6 |
| 3,077,718 | 2/1963 | McLaughlin | 56/17.1 |
| 3,181,619 | 5/1965 | Smith et al. | 56/15.5 |
| 3,203,161 | 8/1965 | Breisch et al. | 56/295 |
| 3,507,102 | 4/1970 | Kline et al. | 56/13.6 |
| 3,507,104 | 4/1970 | Kline et al. | 56/295 |
| 3,508,385 | 4/1970 | Carlson | 56/13.6 |
| 3,657,866 | 4/1972 | Burroughs | 56/15.5 |
| 3,699,752 | 10/1972 | Dandl | 56/13.6 |
| 3,717,981 | 2/1973 | van der Lely | 56/13.6 |
| 3,736,735 | 6/1973 | Kulak et al. | 56/13.6 |
| 4,072,195 | 2/1978 | Carlson | 56/295 |
| 4,104,851 | 8/1978 | Perry | 56/10.4 |

FOREIGN PATENT DOCUMENTS 7810385  2/1979  Netherlands ..................... 56/13.6

Primary Examiner—Paul J. Hirsch
Attorney, Agent, or Firm—Julian C. Renfro

[57] ABSTRACT

A multiple mower arrangement for use on a tractor, comprising a principal mower having at least one rotary blade. A power shaft extends approximately the full lateral width of the principal mower, and delivers power to the rotary blades of such mower. A swingarm mower equipped with a rotary blade is hingedly supported by a hollow arm on the outboard end of the principal mower, with the arm being in turn supported by a hollow hinge. A rotary power shaft extends through the arm and hinge, such that rotary power can be effectively transmitted without the use of belts from the power shaft to the blade of the swingarm mower. A bias arrangement normally biases the swingarm mower into an outwardly extending operative position, with such bias being overcome at such time as the swingarm mower contacts a tree, fencepost, or other fixed object, with power being continuously supplied to the blade of the swingarm mower throughout its full range of operating positions. Advantageously, the angle the swingarm mower bears to the principal mower may be readily and selectively adjusted.

4 Claims, 11 Drawing Figures

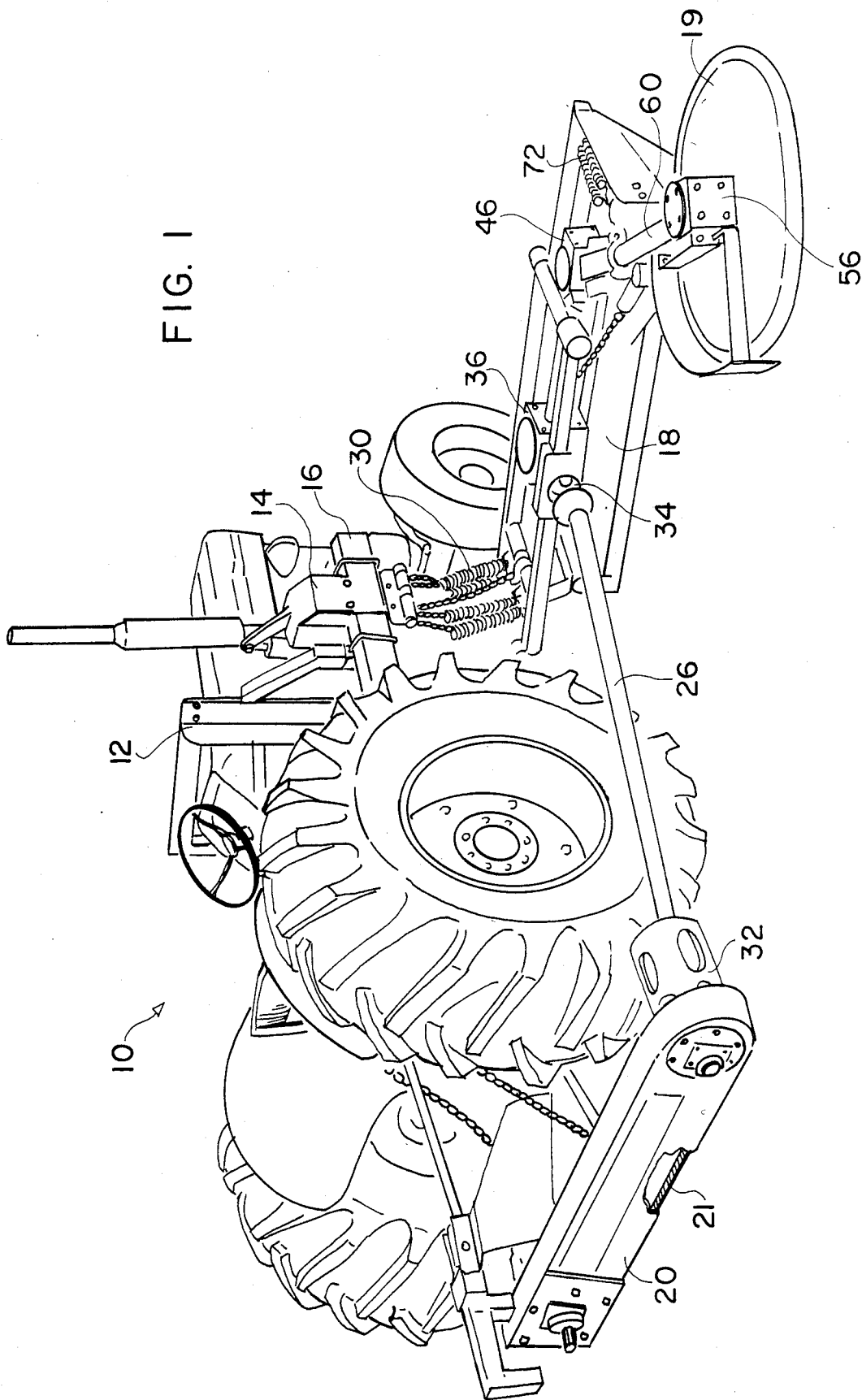
FIG. I

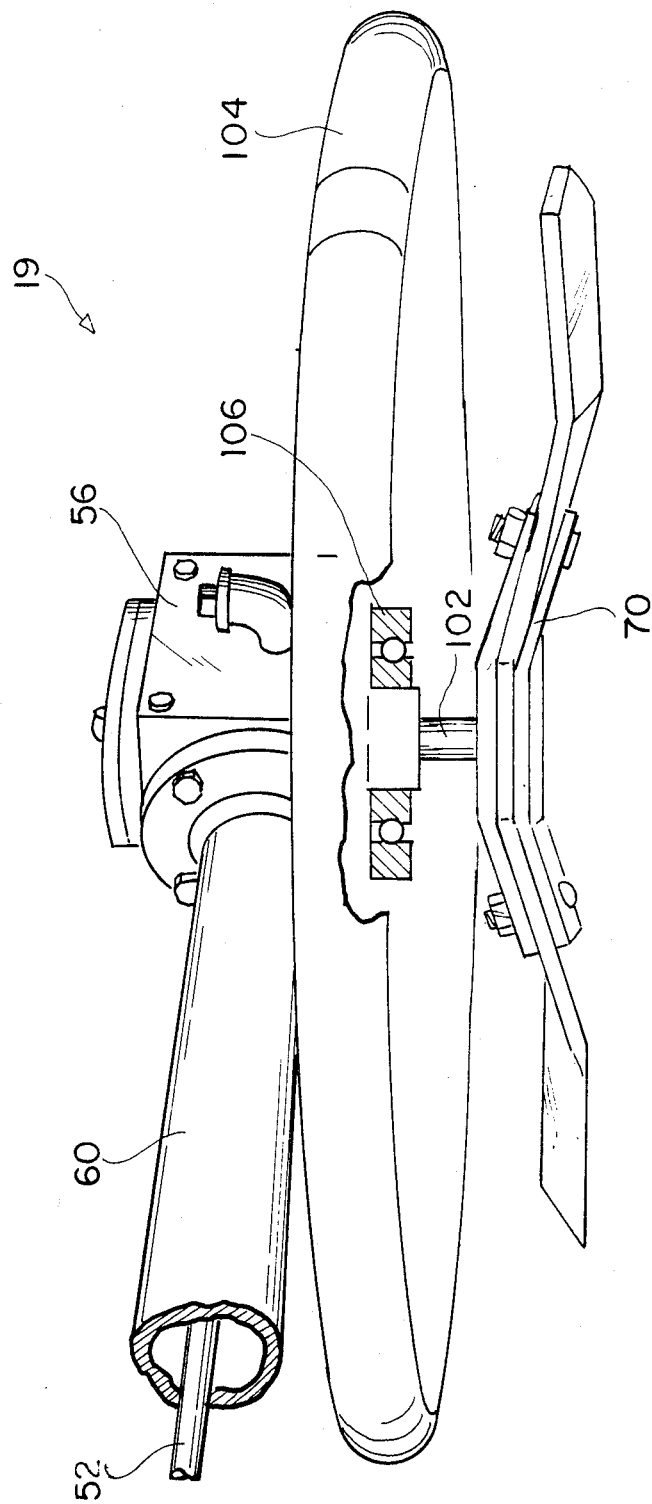

BELTLESS SWINGARM MOWER

BACKGROUND OF THE INVENTION

For many years it has been known to utilize power driven devices such as mowers and cultivators, which make it possible for an operator to peform a substantial amount of work in a field, as well as in and around and under trees with a minimum of effort and expense.

In areas where citrus trees and other types of fruit trees are grown commercially, the limbs of the trees in many instances are heavily weighted by fruit, causing them to hang low, and frequently to present a substantial problem to a tractor operator concerned with mowing or cultivating, in that he must be careful to avoid injury to himself, to the trees and to the fruit.

Before the advent of rotary implements that were laterally shiftable, it was not possible to effectively mow the grove or cultivate the soil beneath the low hanging tree branches in order to reduce soil acidity as well as pests, to promote the welfare of the tree, to increase the yield of fruit, and to enchance appearance.

In accordance with our U.S. Pat. No. 2,777,272 entitled "UNDER TREE MOWER AND HARVESTER" which issued Jan. 15, 1957, we taught a mower and harvester which could be projected as well as retracted at the behest of the tractor operator. Normally, such a rotary implement is maintained at an outboard position, but as the tractor neared a tree, it was possible to retract such rotary implement laterally, and thus avoid entirely undesirable contact with the tree trunk.

In the above cited patent, we taught an implement suspension arrangement involving multiple hinge points, thus enabling the implement to have a floating type characteristic such that it easily followed ground contours. Others of our patents such as U.S. Pat. No. 2,882,978 and U.S. Pat. No. 2,976,663 also were concerned with providing significant improvements to undertree mowers.

As a useful adjunct to the laterally shiftable mower having a multipoint suspension, it is known to utilize a so-called swingarm mower on the outboard end of the cultivator housing, with this swingarm mower also being known as a satellite mower. A swingarm or satellite mower on the one hand serves to effectively increase the width of the path being mowed, but on the other hand such mower is designed to retreat or retract at such time as a tree, fencepost or the like is neared, with the swingarm mower continuing to operate, but in an inboard position, until such time as the tree or fence post has been passed. Then, under the influence of a suitable spring bias, the swingarm mower is designed to return to its normal outboard position, in which it can again serve to increase the effective width of the path being mowed.

Unfortunately, swingarm mowers of the past were belt driven, and because of the necessity of keeping the belts properly taut during all swinging movement, the construction of prior art swingarm mowers was necessarily complex and expensive.

Additionally, and quite importantly, since large amounts of power were being transmitted, and considerable belt flexing was occurring, it was quickly found that the lifetime of the driving belts of prior art swingarm mowers was very short, causing considerable downtime and consequently, a significant loss of profit. It was to remedy the problems associated with prior art swingarm mowers that the present invention was evolved.

SUMMARY OF THE INVENTION

In accordance with this invention we have provided a multiple mower arrangement for use on a tractor comprising a principal mower having at least one rotary blade means, and a power shaft running substantially the lateral width of the mower, in a direction generally perpendicular to the longitudinal centerline of the tractor with which it would be used.

A swingarm mower equipped with rotary blade means is hingedly supported by means of a hollow arm adjacent the outboard end of the principal mower, with the arm being supported by a hollow hinge. Shaft means extend through the arm and hinge such that rotary power can be effectively transmitted without the use of belts from the power shaft to the blade of the swingarm mower.

We use a rotary universal joint in the shaft means at the location of the hinge, with the hollow supporting arm normally being biased forwardly of the straight line position of the universal joint. Thus, when the swingarm mower contacts a tree or other fixed object, the hollow arm pivots rearwardly about its hinge against the bias provided by the bias means. During such rearward movement, the universal joint may or may not reach its straight line position, or it may move beyond such straight line position for a limited number of degrees. As should now be apparent, power may therefore be continuously supplied to the blade means of the swingarm mower, throughout substantial arc of movement of such mower, without the maximum permissible deflection of the universal joint being exceeded.

Other aspects of our invention include a blade means in which oppositely disposed cutting blades are each supported from a single bolt or pin, such that upon the cutting edge of a blade striking a solid object, the blade can retreat rearwardly. Because the bolt or pin supporting each blade is inclined inwardly several degrees from the vertical, the cutting edge of a retreating blade moves upwardly, thus increasing ground clearance, and enhancing the chance that further contact with the rock, root or other solid object will be obviated.

It is therefore to be seen that it is the principal object of this invention to provide a swingarm mower arrangement in which power may be transmitted without the use of belts to the swingarm mower throughout all positions of its deflection away from a normal operating position.

It is another object of this invention to provide a swingarm mower hingedly supported by a hollow shaft at a location adjacent the outboard end of the principal mower of the machine, with rotary power means extending through the hollow shaft and providing power to the swingarm mower despite substantial inward deflections of the mower away from an outwardly extending position.

It is yet another object of this invention to provide a swingarm mower supported by a single arm through which rotary power is applied, with adjustment means being provided such that various adjustments of the arm can be readily accomplished in order to selectively change the angle of the swingarm mower with respect to the principal mower, including changes in the plane of rotation of the the cutting means of the swingarm mower.

It is still another object of our invention to provide an improved cutting blade arrangement in which each blade is mounted upon a single inclined bolt or pin, such that a rearward retreat in of a blade upon striking a solid object is in a clearance-increasing direction.

These and other objects, features and advantages will be more apparent as the description proceeds.

BRIEF DESCRIPTION OF THE DRAWINGS

FIG. 1 is a perspective view revealing the manner in which a principal mower and our novel beltless swingarm mower may be mounted on a tractor, with this view also revealing generally the manner in which power is delivered to the mowers:

FIG. 8 is a side elevational view of the swingarm mower, which has been partially sectionalized in order to reveal the bearing arrangement for the large rotary disc adapted to contact trees and fence posts;

DETAILED DESCRIPTION

Figure 3:
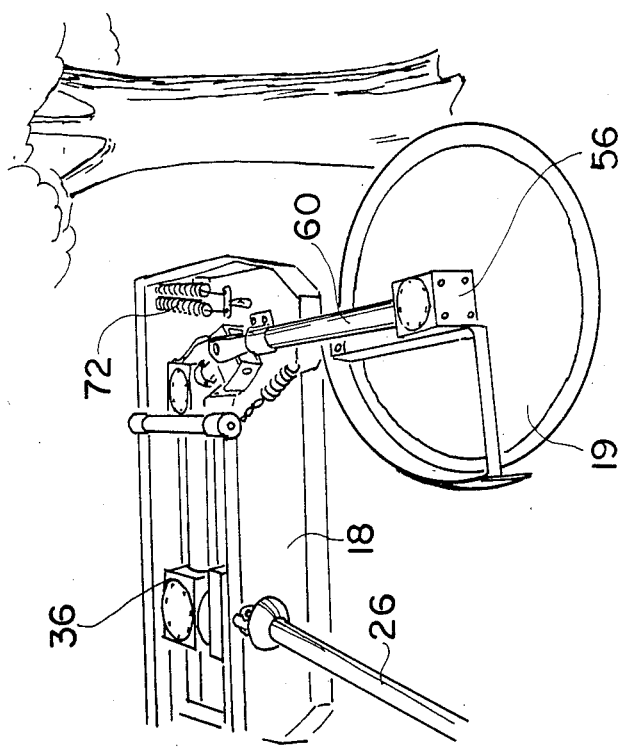
FIGS. 2 and 3 are related fragmentary perspective views, showing in FIG. 2 the normal position of the swingarm mower, and in FIG. 3 an inwardly deflected position of the swingarm mower.

Turning first to FIG. 1, it will there be noted that we have shown a tractor 10 equipped with a forward support member 12 secured to a forward structural portion of the tractor, which member forms a support for removable support member 14. The member 14 in turn forms the support for the forward end of an elongate structural member 16 that extends for essentially the length of the tractor, substantially parallel to the longitudinal centerline of the tractor. The member 16 makes it possible to quickly mount a cultivator or mower attachment, and thereafter readily remove such attachment entirely, or alternatively, to substitute a different type of attachment on the tractor. In the present instance, a mower 18 is shown to be supported from structural member 16, with a novel satellite or swingarm mower 19 supported at the outboard end of the principal mower 18.

The structural details associated with the attachment and the dismounting of cultivators, mowers and the like on a rapid basis was the subject of our copending patent application "Quick Hitch Power Frame", Ser. No. 887,830, filed Mar. 16, 1978, and the details of that invention are not directly a part of the inventive subject matter described herein. However, the teachings of that application are hereby incorporated by reference to this application.

Our patent application Ser. No. 887,830 now U.S. Pat. No. 4,277,080 was principally described with the elongate structural member 16 disposed outboard of the right rear driving wheel of the tractor depicted in that patent application, but for convenience herein, we have shown in FIG. 1 the structural member 16 mounted in the alternative position on the tractor, in which it is inboard of the right rear driving wheel. The present invention is equally applicable to either placement of member 16.

On the rear centerline of the tractor is a power takeoff unit such that rotary power may be supplied to the cultivator, mower or other such attachment, and to that end we provide a chain housing 20 at the rear of the tractor, extending essentially perpendicularly to the longitudinal centerline of the tractor. The chain housing is supported by the components associated with the power takeoff of the tractor, and it in turn supports the rear end of structural member 16, in the general manner described in our copending application. An endless driving chain 21 is disposed in chainhousing 20, with the inboard end of the chain 21 supported by a sprocket (not shown) that is driven by an appropriate connection to the PTO of the tractor. Another sprocket (not shown) located at the outboard end of the chain housing 20 makes it possible to drive an elonate, forwardly extending shaft 26 concerned with supplying rotary power to the mower 18. A guard housing 32 is preferably utilized at the outer end of the chain housing 20, in surrounding relation about the rear end of the shaft 26, which housing 32 serves a number of purposes, including protecting the universal joint (not shown) located between the driven sprocket of the chain housing, and the shaft 26.

As will be noted from several early figures the forward end of shaft 26 is connected to a universal joint 34 (see FIG. 4) which in turn is connected to a first bevel gear drive 36 located atop the mower housing 18. As described at greater length hereinafter, it is the purpose of the gear drive 36 not only to provide rotary power downwardly for the driving of a first cutter in rotation, but also to direct rotary power into short shaft 42 that is concerned with delivering power for the driving of other mower blades described hereinafter; note FIG. 4. The bevel gear drive 36 may for example be manufactured by Hub City of Aberdeen, S.D. and be Model 88. Suitable shaft seals prevent the loss of lubricant from the housing 36.

Figure 5:
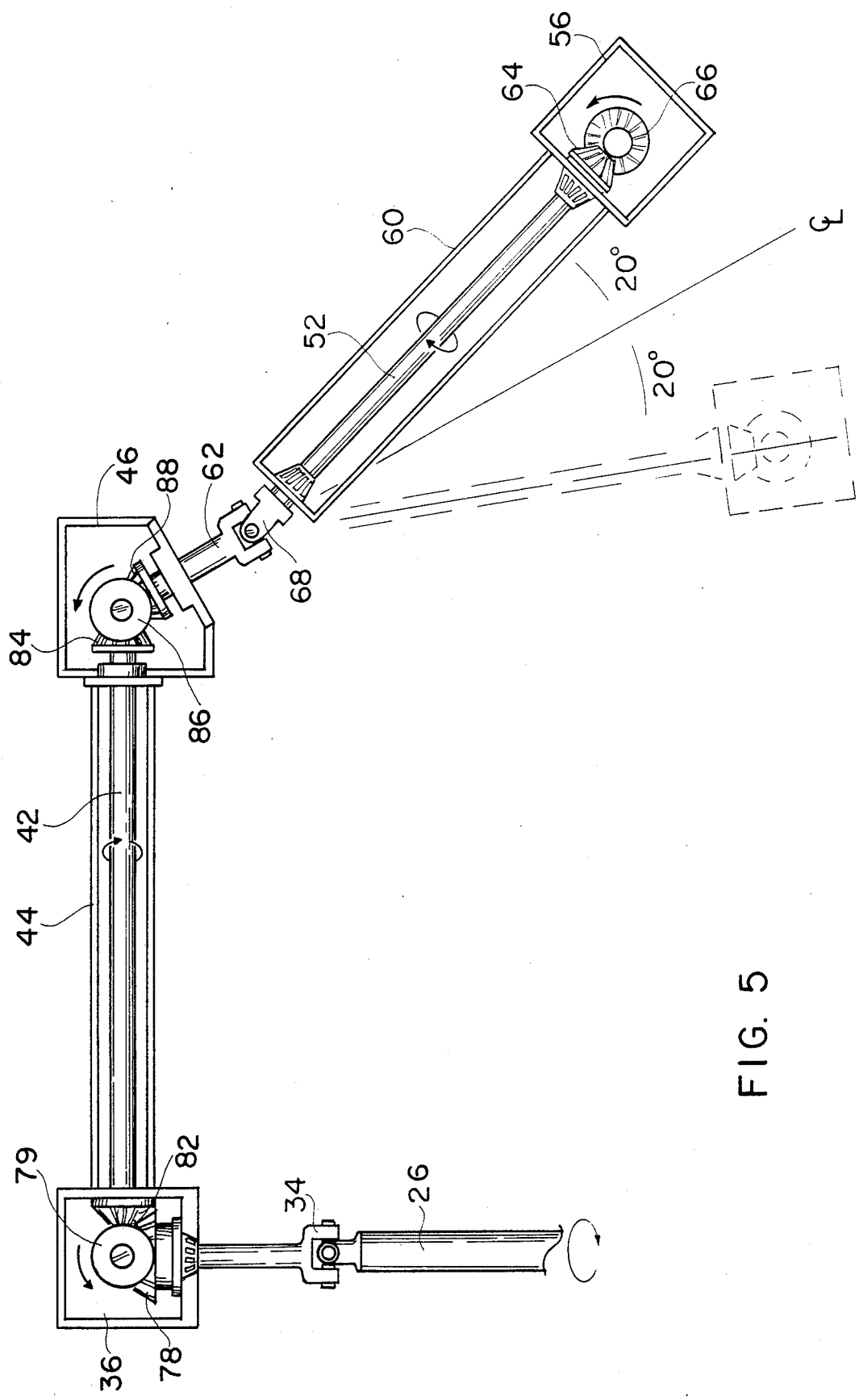
FIG. 5 is a somewhat simplified plan view of the power tram arrangement by which rotary power is supplied to the several mower blades, with this view revealing that the support arm for the swingarm mower is normally biased forward of the straight line position of the universal joint of the swingarm.
Figure 6:
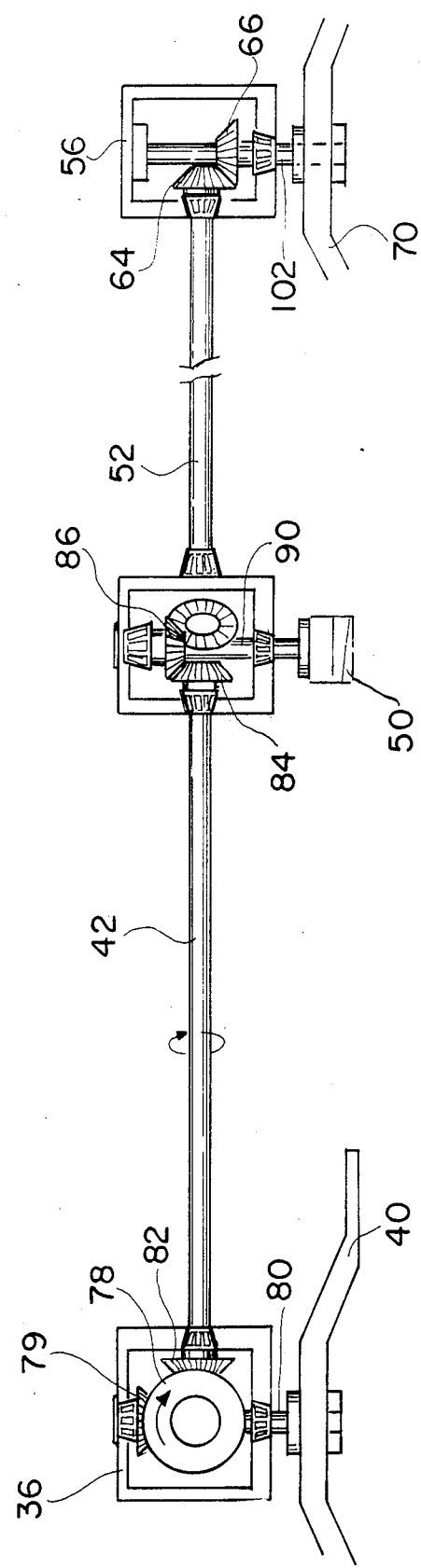
FIG. 6 is a somewhat simplified side elevational view of the power train, revealing preferred gearing arrangements.

As will be noted from the illustration of the power train in FIGS. 5 and 6, a number of gears are provided in the bevel gear housing 36 in order to enable the inboard mower blade 40 (shown in FIGS. 6 and 7) to be driven at an appropriate speed, as well as the short shaft 42 likewise to be driven at an appropriate rotary speed.

Figure 4:
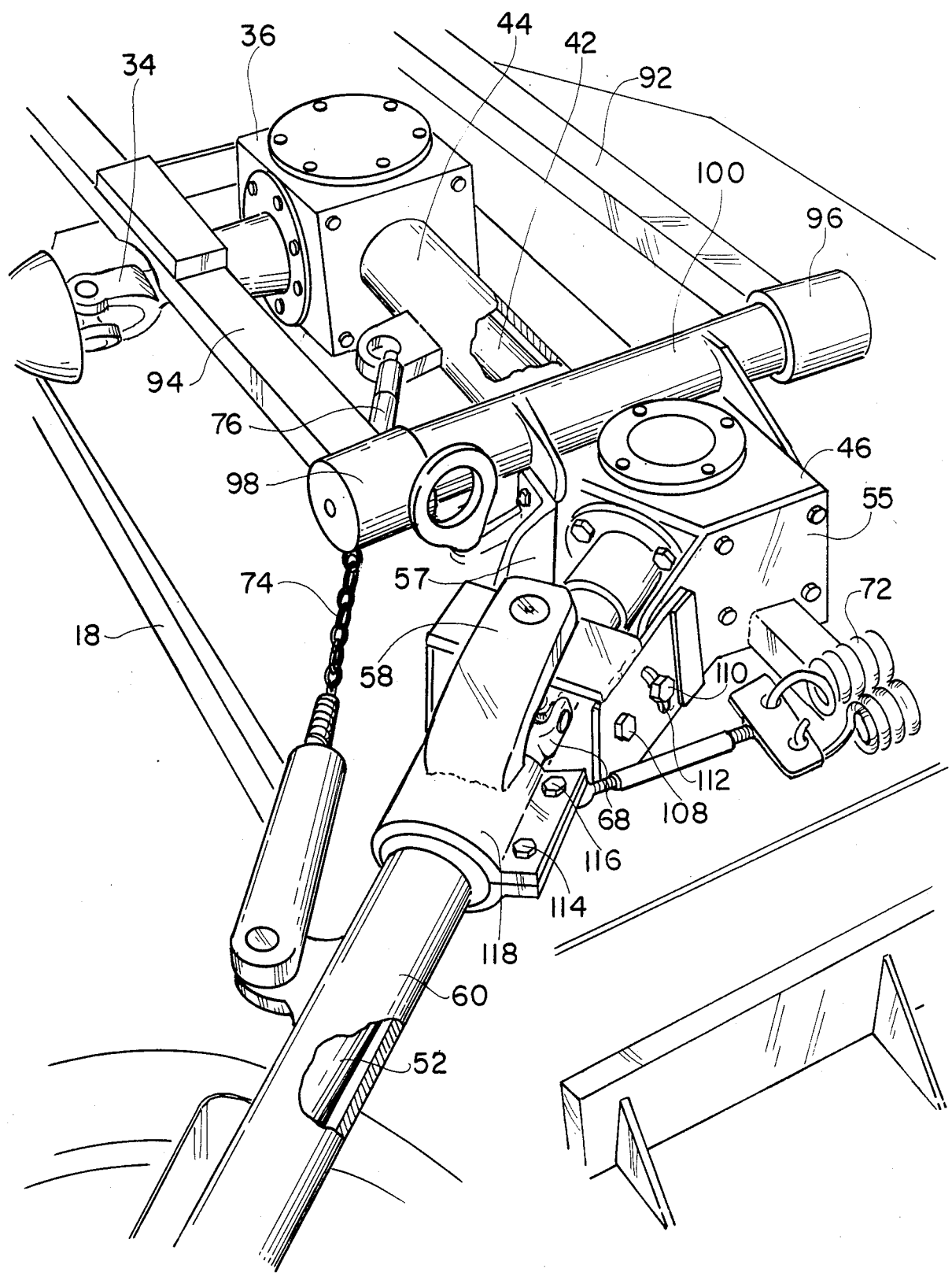
FIG. 4 is a fragmentary pespective view of a large scale in order to reveal certain significant details of the hinged mounting of the swingarm mower, as well as the shaft arrangement by which rotary power is supplied to the satellite mower.

The outboard end of the shaft 42 connects to second bevel gear drive 46, where it serves to provide rotary power not only to a bevel gear 84 (FIG. 6) associated with driving the second mower blade 50 in rotation, but also is concerned with supplying rotray power to the shaft 52 concerned with supplying rotary power to the satellite or swingarm cutter 19; note FIG. 4. These and other such details of the shaft means will be described at greater length hereinafter.

In FIG. 4 it will be noted that intermediate shaft 42 is preferably enclosed in a rigid tubular member 44 that is utilized for the protection of the user, to prevent damage to the shaft, and to prevent vines and the like from wrapping around the shaft 42. Further, the member 44 establishes a fixed relationship between bevel gear drive housings 36 and 46.

Connected to the second gear housing 46 are sturdy brackets 55 and 57, supporting one portion of a large hinge joint 58 that in turn forms a support for the hollow swingable arm 60 that supports swingarm mower 19; note FIG. 4. As will be obvious, a swingarm mower 19 provided in accordance with this invention makes it possible to cut a much wider path than would be possible if the principal mower 18 was the only mowing attachment utilized on the tractor.

In addition to power being supplied downwardly from the second bevel gear housing 46 for the driving of the second mower blade means of the mower 18, shaft power is also supplied at 120° angle to a short shaft 62 that drives a rotary universal joint 68 located interiorally of the large hinge joint 58, with the outer end of the universal joint 68 being connected to the drive shaft 52 located inside of the arm 60; note FIGS. 4 and 6. It is by means of shaft 52 that power is continuously supplied through the arm 60 to the rotary mower blades utilized in the swingarm mower 19. The construction and cooperation of all the mower blades will be described at greater length in connection with FIGS. 6 and 7.

Returning to FIG. 2, it will be noted that the swingarm mower 19 ordinarily extends outboard of the mower 18 for a distance approximating the diameter of the mower, but by virtue of the hinge joint 58 utilized in the manner shown in FIG. 4, it is possible for the swingarm mower to deflect against a spring bias for a considerable distance inwardly from its normal position at the time an obstacle such as a tree is encountered. For example, in FIG. 2, the drive should aim the tractor such that the outer end of the principal mower 18 carefully avoids contacting the tree, although the swingarm mower 19 may make direct contact with the tree.

As shown in FIG. 3, upon the swingarm mower contacting the tree, it is caused to rotate about the hinge joint 58 shown in FIG. 4, with the large tension springs 72 revealed in this figure in connection with the swingarm being caused to elongate at such time. By virtue of the novel shaft arrangement we use, power continues to be supplied to the swingarm mower throughout its period of inward deflection.

Figure 2:
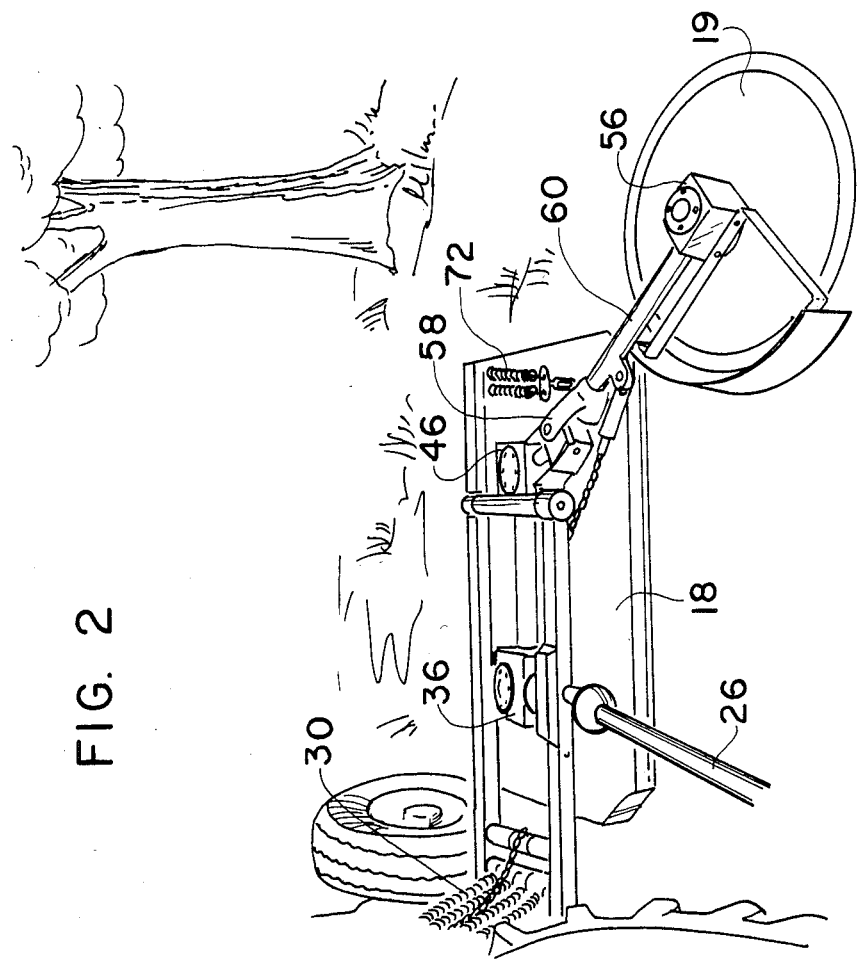

After the swingarm mower has gone past the tree, the tension springs 72 cause the mower 19 to return to the position shown in FIGS. 1, 2 and 4, so that a wide path mowing effort can resume. A chain 74 utilized in the manner shown in FIG. 4 prevents the swingarm mower from moving further outboard than the position shown in FIG. 2, and a shock absorber 76 may be used in the linkage to lessen shock.

Significantly, we have designed and positioned the swingarm mower in such a way as to minimize the rotation of the U-joint 68 used interiorally of the hinge 58. On the other hand, our design enables ample movement of such mower as to permit appropriate travel of the swingarm mower at such time as a tree, fence post or other such fixed item is encountered.

It is thus to be realized that the geometry chosen is such as to enable maximum excursion of the swingarm mower, while at the same time minimizing the need for a substantial amount of angular rotation of the U-joint 68.

For example, when the swingarm is in its normal or forward operating position shown in FIG. 2, the U-joint can reside at say a 20 degree angle forward of its straight line position, and at this angle it can easily transmit a considerable amount of torque. Then, as the mower contacts a tree or other fixed object, the swingarm is caused to rotate rearwardly against the bias of the springs 72, with such angular rotation at the U-joint usually passing through the straight line position at the approximate mid-point of the rearward rotation of the U-joint.

The swingarm 60 may obviously rotate beyond the straight line position of the U-joint 68, to a point say 30 degrees beyond the straight line position, but inasmuch as at that time the swingarm mower is trailing behind the forward mower, the mowing efforts of the swingarm mower at that point are relatively ineffective.

Therefore, we typically expect the swingarm mower to travel no more than approximately 20 degrees on either side of the straight line position of the U-joint, for a total of approximately 40 degrees. Note FIG. 5.

In order for all of the foregoing to be possible, we construct the second bevel gear housing 46 to have an output at a location that is 120 degrees away from its input. In other words, housing 46 differs from prior art boxes of this type by having an output that is not located 90 degrees to its input.

Returning to FIG. 4, we utilize in connection with the support of principal mower 18, a pair of arms, a front arm 92 and a rear arm 94 that extend for a substantial distance along the top of the mower housing, forming the support therefor. These arms are each in the form of a pair of telescoping members, each containing on its upper surface, a series of aligned holes, such as holes disposed on say three inch centers. Thus, the distance away from the tractor that the outboard end of the mower 18 is disposed can be established in accordance with the needs of the particular situation, and such entails the placement of bolts in aligned holes in the arms selected to best provide the desired relationship of the mower to the tractor.

It is to be noted in FIG. 1 that we use a group of say four tension springs 30 for lessening the weight of the mower on the ground. The upper ends of these springs may attach to a spring support plate bolted to the bottom of a member supported by the elongate member 16, with the lower ends of the springs being fixed to sleeves mounted on a bar extending between the arms 92 and 94, with this bar being spaced say 6 inches outboard of the main support joint.

On the outboard end of each of the arms 92 and 94 are welded separate members 96 and 98 known as cuffs, with these residing over the ends of a tube member 100 of sturdy construction that is disposed in substantial parallelism with the longitudinal centerline of the tractor, which means that the tube 100 is substantially perpendicular to the arm 92 and 94. Because lifting of the mower frame is to be accomplished from this location at such time as the mower 18 is to be swung to a substantially upright position, we secure the tube 100 firmly to the frame of the housing 18 as well as to the second gear housing 46. Preferably this is accomplished by welding gusset plates to the tube 100, which plates are bolted to the gear housing 46; note FIG. 4.

Figure 7:
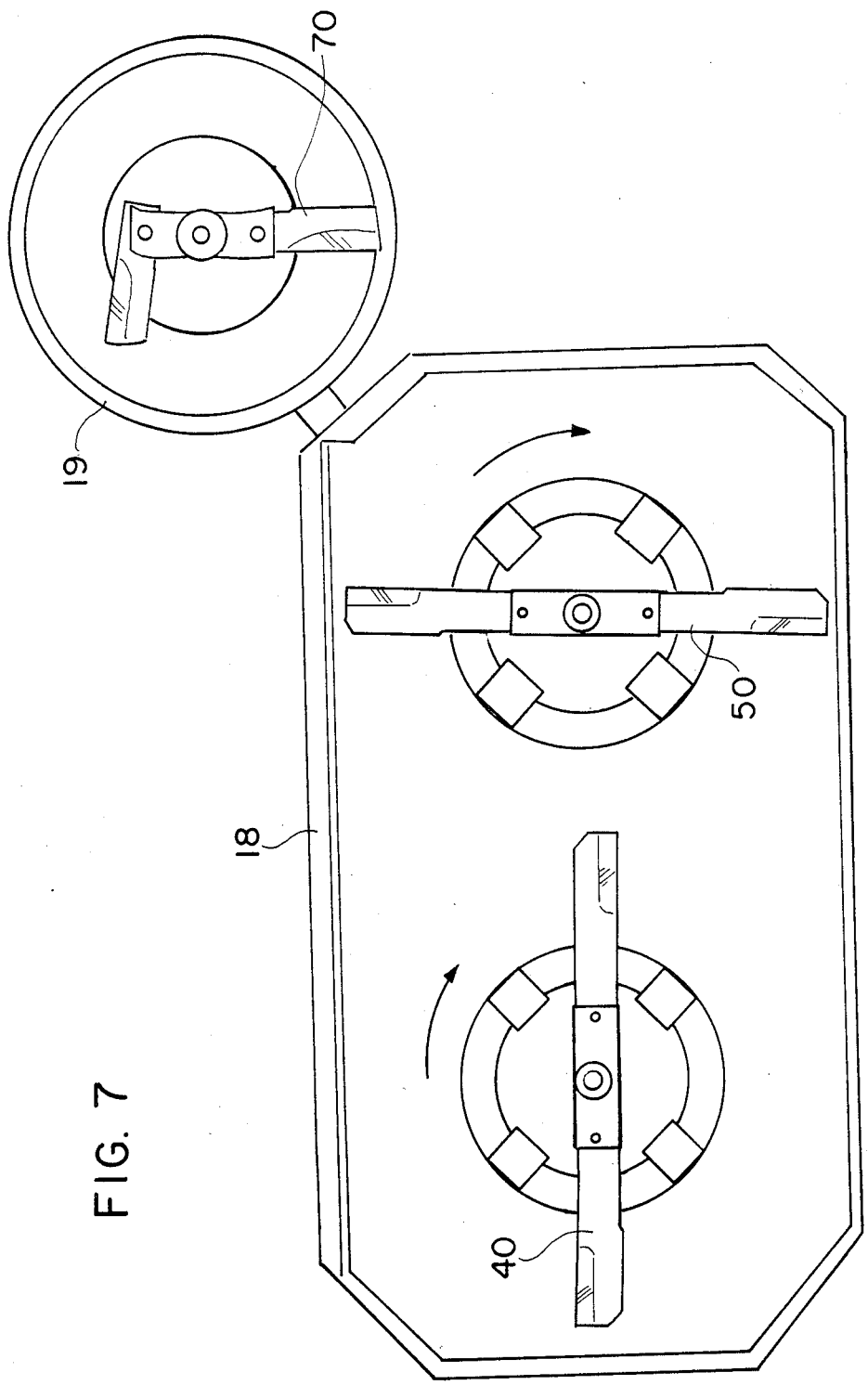
FIG. 7 is a view taken of the underside of the mowers, revealing that they all turn together in a direction such that weeds and brush will be brought out from under the trees.

Turning in particular to related FIGS. 5 and 6, it will there be seen that we have shown with greater specificity, some of the essential relationships associated with the drive train by which power is supplied to the shafts responsible for subsequently bringing about rotation of the mower blades 40, 50 and 70 shown in FIGS. 6 and 7.

In FIG. 5 it will be noted that the shaft 26 supplies rotational power to universal joint 34, and by the latter, power is supplied to input bevel gear 78 of the bevel gear drive housing 36. This component may be a Model 88 bevel gear drive made by Hub City, as previously mentioned. The bevel gear 78 in turn supplies rotational power to the upper bevel gear 79 of the housing which, as shown in FIG. 6, is mounted on the upper end of vertically disposed shaft 80 that delivers power downwardly to the mower blade 40 located directly below the gear housing 36. A certain direction of rotation is not mandatory, but it is highly desirable for the direction of rotation to be such that weeds cut from under trees will be removed from such locations. It is also desirable in accordance with this embodiment for all of the mower blades to turn in the same direction, so that the blades 40 and 50 associated with gear drive housings 36 and 46 can be caused to avoid contact with each other during rotation. In this regard note that blade 40 in FIG. 6 is essentially disposed in the plane of the paper, whereas the blade 50 is orthogonal thereto.

In order to make clear the directions of rotations that were arbitrarily chosen in this instance, it can be assumed that shaft 26 is rotating clockwise, therefore causing gear 78 of FIGS. 5 and 6 to rotate in the same direction, whereas gear 79 responsible for driving mower shaft 80 is caused to turn counterclockwise, as viewed in FIG. 5.

Gear 78 is preferably a comparatively large, 30 tooth bevel gear, whereas gear 79 is preferably a 15 tooth gear. Inasmuch as input gear 78 turns clockwise, output gear 82 of housing 36 with which it meshes, causes shaft 42 to turn in the direction of the arrow in FIGS. 5 and 6 (clockwise), and therefore to cause the input gear 84 of gear housing 46 to turn in the same direction. Latter gear meshes with upper gear 86 that, as revealed in FIG. 6, is mounted on the upper end of mower blade drive shaft 90, with this gear therefore turning counterclockwise as shown in FIG. 5, thus bringing about the mower blade 50 avoiding undesirable contact with the mower blade 40, which of course turns in the same rotative direction, but displaced 90° therefrom.

By virtue of meshing with bevel gear 86, output bevel gear 88 supplies rotative power to short shaft 62 (see FIG. 5) that in turn supplies power to the U-joint 68 that is located inside of large hinge 58. The direction of rotation of shaft 62, and shaft 52 driven thereby, is shown in FIG. 5.

The output of shaft 52 is supplied to input bevel gear 64 of swingarm housing 56, which housing may be a Model 600 bevel gear drive manufactured by Hub City, although we obviously are not to be limited thereto. The gear 64 meshes with bevel gear 66, which is mounted on a lower portion of vertical drive shaft 102 in order that the shaft 102 and associated mower blade 70 of the satellite mower will be driven in the same rotative direction as blades 40 and 50.

As will be noted from FIG. 7, all three mower blades turn the same direction, clockwise as viewed from below, inasmuch as in this embodiment, this direction of rotation serves to remove weeds and brush from under the trees. Although in this instance, blade means 40 and 50 are shown to be of a larger diameter than blade means 70 of the swingarm mower, this is not a necessity, and all three blade means may be of the same diameter.

Turning to FIG. 8, it will there be seen that we have shown the satellite mower 19 partly in section in order to reveal internal construction. As previously explained, the mower blade 70 is driven in rotation by the downward extending shaft 102, but inasmuch as it is desirable for the satellite mower to "roll" around a tree with minimum friction, we mount the large ring 104 in a suitable bearing arrangement 106. In this way, the satellite mower can move past a tree or fence post with minimum resistance.

It may be desirable to be able to adjust the arm 60 upwardly or downwardly in order that the swingarm mower will be maintained in the desired relationship to the tractor and the principal mower when operating over ridges or other types of uneven terrain. To this end, instead of utilizing a multiplicity of bolts placed in tight fitting holes in order to connect the arm 60 to its hinged support, we instead utilize, as shown in FIG. 4, a bolt 108 and a bolt 110 on each side, with a slot 112 being provided in bracket 55 to receive bolt 110. A similar slot is located on the opposite side, in bracket 57. Therefore, to perform an angular adjustment of arm 60, it is but a simple matter to loosen all four of the bolts directly concerned with supporting the arm 60, which enables the aligned pair of bolts 108 to serve as pivots, and the bolts 110 located in the slots to move such that the desired degree of angularity can be achieved. At this point, the four bolts are retightened to firm up the selected position.

It is most important to note in FIG. 4 that the bolts 114 and 116 can be adjusted in order to give rotational versatility to the swingarm mower. These bolts represent the means by which the collar 118 can be tightened around the inner end of the swingable arm 60. For example, when working around trees having large exposed roots, it may be desirable to upwardly incline the forwardmost part of the cutter 19, so as to minimize undesirable contact of the rotating blades with the roots. Significantly, because of the geometry we use, the high part of the blade continues to face the tree roots throughout all rotational positions of the hinge joint 58, and it is only when the swingarm mower is about to part contact with that tree that the mower blades may possibly come into contact with the roots.

It should be noted that in contrast, a belt driven satellite mower of the prior art could not be rotated or twisted in a manner so as to minimize root contact, unless the belts be twisted out of their normal plane of operation, which greatly decreases their normal operating life, and also decreases the amount of power they can transmit.

Figure 9:
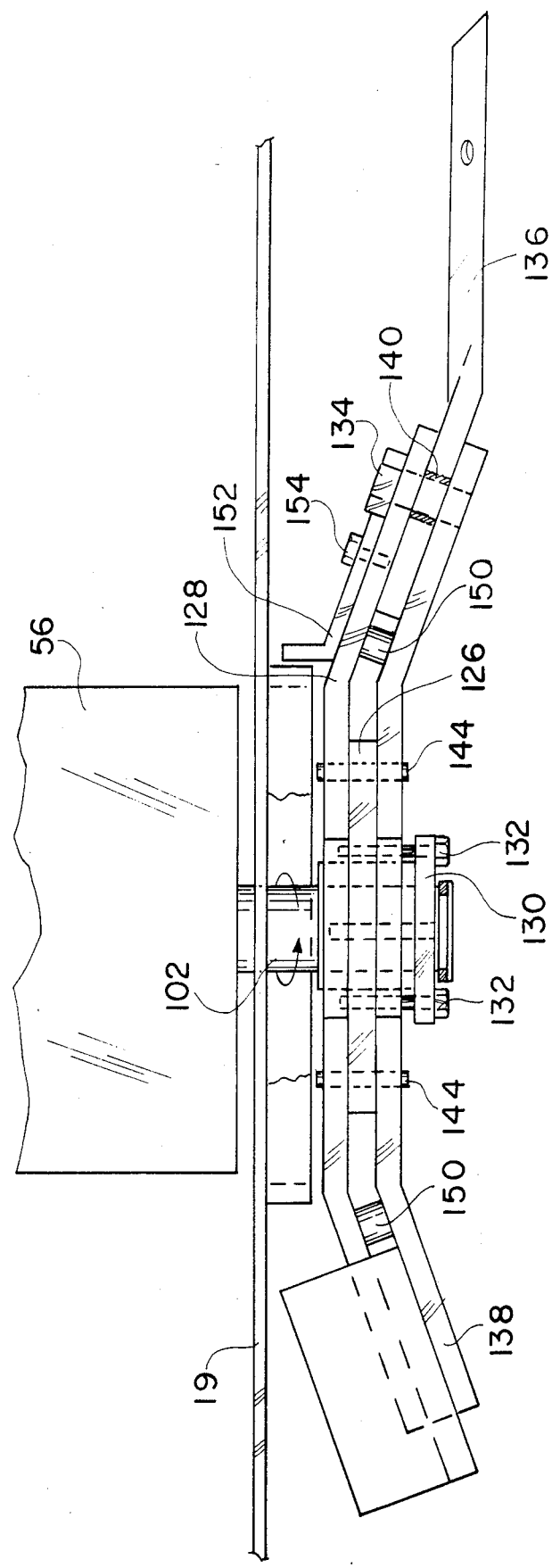
FIG. 9 is a side elevational view of the novel blade support arrangement, with certain portions cut away to reveal internal construction.

Turning to FIG. 9, it will be seen that we have shown by means of a vertical section, a preferred arrangement for mounting the cutter blades associated with the principal mower 18 as well as the satellite mower 19. In this instance, we will describe the blade support arrangement in connection with bevel gear drive 56.

Figure 10:
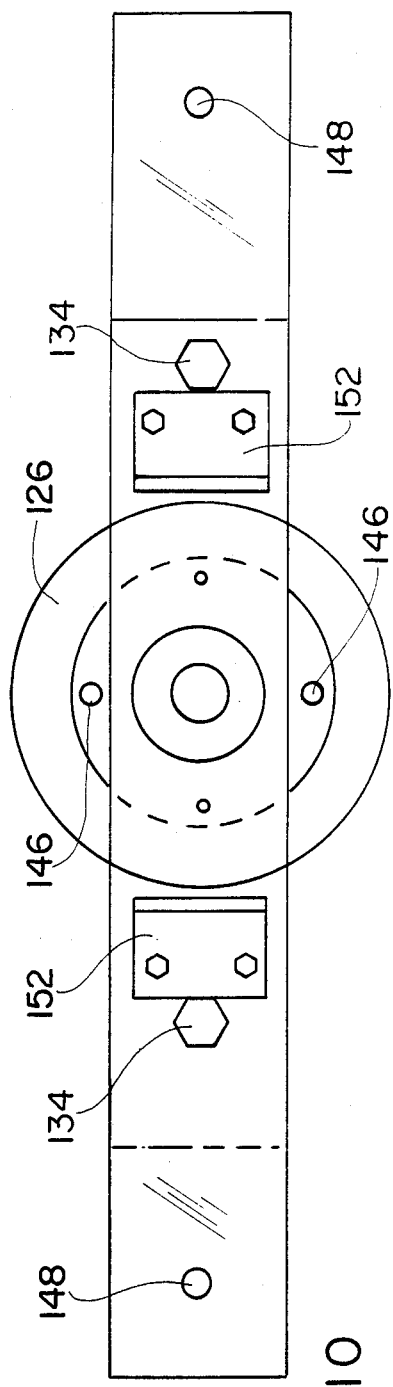
FIG. 10 is a plan view of the blade arrangement of FIG. 9.

Extending downwardly from gear drive 56 is shaft 102 upon which is mounted a carrier hub 126 serving as the support for the blade arrangement as well as for delivering rotary power to the blades 136. The carrier hub is preferably round, as shown in FIG. 10, and serves to directly support the upper carrier bar 128. As will be noted from FIG. 9, the ends of the upper carrier bar are inclined downwardly between fifteen degrees and twenty-five degrees, preferably at twenty degrees, so that when an individually mounted blade 136 strikes an object such as a root, rock or a rise in the ground, and then retreats rearwardly about its mounting bolt, that blade will rise an inch or so above its normal cutting plane, thus increasing clearance and hopefully avoiding further contact with such object.

Although several different ways could be utilized for securing the upper carrier bar to the downwardly extending shaft 102, we prefer to use a tapered mounting bushing 130, such as manufactured by Browning of Maysville, Ky. Upwardly extending, vertically disposed bolts 132 in the tapered mounting bushing, when tightened, cause the upper carrier bar 128 to be secured tightly to the lower end of shaft 102, which relationship need not be disturbed during subsequent blade changing procedures, described hereinafter.

As will be noted from FIG. 9, a blade mounting bolt 134 is utilized near each end of the upper carrier bar, and these bolts form the single support for each cutting blade 136. We prevent the blades from falling off of the mounting bolts by the utilization of a lower carrier bar 138, which is shaped quite similarly to the upper carrier bar in that its ends also incline downwardly. The holes in the lower carrier bar coinciding with the location of the bolts 134 are tapped, so that upon these bolts being tightened by the use of a suitable wrench, the lower carrier bar is drawn up tightly against the underside of the carrier hub 126. In order to prevent inhibiting a cutter blade from readily swinging about its mounting bolt upon striking a hard object, we utilize a blade spacer bushing 140 around each bolt and a sufficiently large mounting hole in each cutting blade 136 in order to assure that each blade will swing freely about its bolt.

With regard to the blade mounting, it is important to realize that the bolts 134 are disposed inwardly off the vertical, so that if a blade hits a root or a high spot, the blade rotates about its pin or bolt rearwardly, out of its normal cutting plane. This rearward retreat is away from the ground, and this serves to minimize scuffing of the ground by the blade. For example, the tip of each blade may travel upwardly approximately an inch or two during rearward rotation of the sharpened blade about its mounting bolt or pin.

Figure 11:
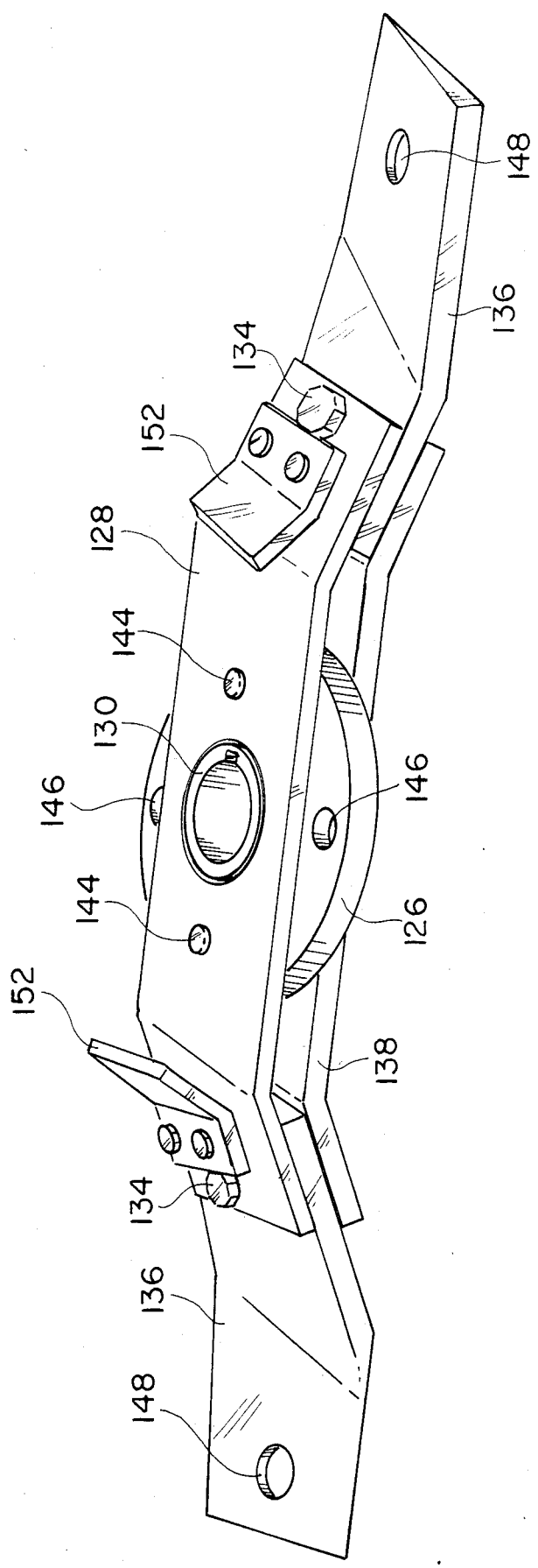
FIG. 11 is a perspective view of the novel blade arrangement.

The blades 136 are preferably bent approximately at their midpoints, such that their cutting edges are quite close to being horizontal. No lifting action on the grass is created if the blades are bent at 90° to their length, as shown in FIG. 10, but if it is desired to bring about a suction causing the grass to lift, the blades are bent on a diagonal, so as to place a twist in the blades, as shown in FIG. 11. This twisting causes the cutting edge of each blade to be disposed an inch or so lower than the trailing edge of the blade. Suitable holes are provided in the housing to permit the flow of air therethrough when blades with a lifting action are used.

Despite due care on the part of a tractor operator, it is always possible for one of the blade means to jam on a root or a rock, and come abruptly to a stop. In such instance, the other blade means of the machine still possess a considerable amount of kinetic energy, which must be allowed to dissipate without tearing up a gear box or other component. We have found the most satisfactory safety arrangement to involve the use of shear pins, in which appropriately aligned holes are provided in the upper carrier bar 128 and the lower carrier bar 138, so that these bars can be secured to the carrier hub 126 by means of a pair of shear pins 144. As shown in FIGS. 9 and 10, these shear pins are typically 180° away from each other, and they may for example be ¼ inch in diameter.

Should these pins be caused to shear, it is but a simple matter to rotate the carrier bars for 90°, and then drive the broken pin ends out through the larger holes 146 of the carrier hub 126.

Down time of the mower can be deceased by creating mounting holes 148 near the opposite ends of each blade 136, and sharpening both of the opposite leading edges of the blades. It is but a simple matter to switch blade ends when one edge gets dull, and to then use the other edge, thus minimizing the need for returning the blade to the shop for sharpening at this particular time.

It will be noted from FIG. 9 that the blade 136 on one side of the rotating assembly has been shown in the retreated or retracted position, which is the position taken after the blade has struck a solid object. As previously mentioned, a retreated blade moves upwardly, thus increasing ground clearance. A blade stop 150 may be utilized to prevent a blade from rotating about its pin or bolt beyond a certain point.

It will be noted in FIGS. 9 through 11, we prefer to use an anti-wrap slinger arm 152 on top of each end of the upper carrier bar 128. These members minimize wrappage of vines about the shaft 102 by cutting same during rotation of the carrier bars. The arms 152 are held in place by respective bolts 154, with the outer ends of members 152 preferably being positioned against the heads of mounting bolts 134 in order to prevent latter bolts from loosening during blade operation.

As is obvious, our broad concept of a beltless, easily adjusted swingarm mower can be exemplified by a number of different physical embodiments, and we are not to be limited to any one embodiment except as required by the scope of the appended claims. For example, although the principal mower 18 has been illustrated to have two rotary blade means, it is easily possible for us to use our novel satellite mower 19 with a mower 18 having only one blade means. Another example involves the support for the sharpened blades, such that they may retreat upon striking a hard object such as a stone or root. Smooth pins held in place by the blade carrier bars may be used instead of bolts 134.

Although we have illustrated as a preferred embodiment, the principal mower 18 operatively located near the front of the tractor, we can of course mount the principal member adjacent the rear of the tractor. In this latter event, power would be supplied to the mower 18 by a relatively short shaft extending rearwardly from the power takeoff unit of the tractor into the forward part of the mower.

In the rearwardly mounted mower arrangement, the satellite mower 19 would be operatively mounted on the outboard end of the mower 18, which would place the satellite mower somewhat rearward of the driver.

As earlier pointed out in connection with our "Quick Hitch Power Frame" application Ser. No. 887,830, now U.S. Pat. No. 4,277,080 the member 16 may be disposed outboard of the rear wheel of the tractor, which arrangement permits the principal mower and its satellite to be mounted in any of a number of selected positions along the length of the tractor.

Although in the interests of clarity we have not depicted a cover on the principal mower, we prefer to use a properly contured sheet metal cover on the top of mower 18, such that overhanging limbs will not tend to catch or snag on components of the mower. Along the forwardmost edge of the mower 18 we may use an elongate member whose height may be readily adjusted so that when the mower is used under fruit trees, low hanging fruit will be eased over the top of the mower. When operating in high grass, the elongate member may be raised, or entirely removed.

We claim:

1. A multiple mower arrangement for use on a tractor, comprising a principal mower having at least one rotary blade, a power shaft running substantially the length of said principal mower and delivering rotary power to the blade or blades of said mower, a swingarm mower equipped with a rotary blade and being hingedly supported by means of a hollow arm on the outboard end of said principal mower, said arm being supported by a hollow hinge, shaft means extending through said arm and hinge, such that rotary power can be effectively transmitted without the use of belts from said power shaft to the blades of said swingarm mower, and adjustment means provided in the support for said arm, such that the angle the swingarm mower bears to the principal mower may be readily and selectively adjusted, said adjustment means permitting the position of the swingarm mower to be adjusted heightwise as well as rotationally.

2. A multiple mower arrangement for use on a tractor, comprising a principal mower having at least one rotary blade means, a power shaft extending substantially the full lateral width of said principal mower and delivering rotary power originating in the tractor engine to the blade means of said mower, a swingarm mower equipped with rotary blade means, and being hingedly supported by means of a hollow arm adjacent the outboard end of said principal mower, said arm being in turn supported by a hollow hinge, shaft means operatively extending through said arm and hinge, including a universal joint located inside said hollow hinge, such that rotary power can be effectively transmitted without the use of belts from said power shaft to the rotary blade means of said swingarm mower, bias means biasing said hollow arm forwardly to a position in which said universal joint is deflected forwardly of its straight line position, but upon said swingarm contacting a fixed object, said arm being moved rearward about its support hinge against the bias of said bias means, with such rearward movement taking place in such a way that the arm may pass through the straight line position of said universal joint, and pass for a limited number of degrees beyond such straight line position.

3. The multiple mower arrangement as defined in claim 2 in which adjustment means are provided in the support for said arm, such that the angle the swingarm mower bears to the principal mower may be readily and selectively adjusted.

4. The multiple mower arrangement as defined in claim 3 in which said adjustment means permits the position of the swingarm mower to be adjusted heightwise as well as rotationally.

* * * * *